(12) United States Patent
Roden et al.

(10) Patent No.: US 8,861,507 B2
(45) Date of Patent: Oct. 14, 2014

(54) SYSTEMS AND METHODS FOR AUTOMATIC PUBLIC SWITCHED TELEPHONE NETWORK BACKUP OF VOICE OVER INTERNET PROTOCOL SERVICES

(75) Inventors: Barbara Roden, Atlanta, GA (US); John Joe Horton, Jr., Acworth, GA (US); Glenda R. Horton, legal representative, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 470 days.

(21) Appl. No.: 12/822,389

(22) Filed: Jun. 24, 2010

(65) Prior Publication Data
US 2010/0322082 A1    Dec. 23, 2010

Related U.S. Application Data

(62) Division of application No. 10/922,589, filed on Aug. 20, 2004, now Pat. No. 7,768,997.

(51) Int. Cl.
*H04L 12/66* (2006.01)
*H04L 29/06* (2006.01)
*H04M 7/00* (2006.01)
*H04L 29/14* (2006.01)

(52) U.S. Cl.
CPC ...... *H04L 65/1043* (2013.01); *H04L 29/06027* (2013.01); *H04M 7/0057* (2013.01); *H04L 69/40* (2013.01); *H04L 65/1069* (2013.01)
USPC .......................................... 370/352; 370/216

(58) Field of Classification Search
CPC ......... H04M 3/301; H04M 3/12; H04M 3/30; H04M 1/82; H04M 7/0096; H04L 12/2856; H04Q 2213/13176; H04Q 3/0029; H04Q 3/66; H04Q 2213/13103; H04Q 2213/13377; H04Q 3/0016; H04Q 2213/13141; H04Q 3/0079
USPC ............... 379/377, 413.02, 413.03, 2, 15.05, 379/9.05, 22.03, 219–221.04, 379, 412.03; 370/352–356, 216, 241, 242
See application file for complete search history.

(56) References Cited

U.S. PATENT DOCUMENTS

| | | | |
|---|---|---|---|
| 5,515,418 A | 5/1996 | Yamaguchi et al. | |
| 5,600,715 A | 2/1997 | Bingel | |
| 5,959,972 A * | 9/1999 | Hamami | 370/228 |
| 6,108,300 A * | 8/2000 | Coile et al. | 370/217 |
| 6,301,340 B1 | 10/2001 | Sansom et al. | |
| 6,765,908 B1 * | 7/2004 | Chen | 370/392 |
| 7,263,362 B1 | 8/2007 | Young et al. | |
| 7,580,348 B2 * | 8/2009 | Maruyama et al. | 370/219 |
| 7,688,803 B1 * | 3/2010 | Young et al. | 370/352 |
| 2002/0090962 A1 * | 7/2002 | Struhsaker et al. | 455/462 |
| 2003/0133437 A1 | 7/2003 | Richardson et al. | |
| 2003/0202462 A1 | 10/2003 | Smith et al. | |
| 2005/0281204 A1 * | 12/2005 | Karol et al. | 370/248 |

* cited by examiner

*Primary Examiner* — Akelaw Teshale
(74) *Attorney, Agent, or Firm* — Myers Bigel Sibley & Sajovec

(57) ABSTRACT

A backup public switched telephone network (PSTN) line is provided to a broadband network connection by detecting unavailability of the broadband network connection and automatically connecting local site wiring to the PSTN line responsive to detecting unavailability of the broadband network connection and disconnecting local site wiring from the PSTN line if unavailability is not detected.

8 Claims, 5 Drawing Sheets

SYSTEMS AND METHODS FOR AUTOMATIC PUBLIC SWITCHED TELEPHONE NETWORK BACKUP OF VOICE OVER INTERNET PROTOCOL SERVICES

RELATED APPLICATIONS

This application claims priority under 35 U.S.C. §120 as a divisional application of U.S. patent application Ser. No. 10/922,589 filed Aug. 20, 2004 now U.S. Pat. No. 7,768,997, the disclosure of which is hereby incorporated herein in its entirety by reference.

FIELD OF THE INVENTION

This invention relates to communications networks, and more particularly to the backup of voice over network communications with a public switched telephone network.

BACKGROUND OF THE INVENTION

Voice over Internet Protocol (VOIP) systems provide voice communications over a digital network, such as an Internet Protocol (IP) network. In conventional systems for providing VOIP service, conventional telephones (analog phones) may be connected to local site wiring through a terminal adapter at each telephone. Alternatively, a VOIP telephone may be used without a terminal adapter. A local network adapter converts the signals received from the local site wiring to digital data communications and forwards the communications over a broadband connection, such as a Digital Subscriber Loop (DSL) connection, to a central location. Data from the central location is received over the broadband connection by the local network adapter, converted to the appropriate signals for the telephones and forwarded on the local site wiring to the telephones.

Power for the VOIP service is, typically, provided at the local site. As a result, if power is lost at the local site, the network adapter may no longer operate and telephone service may be unavailable. Likewise, if there is a problem with the broadband connection, either at the local site or at the central location, telephone service may be lost.

A conventional technique to avoid loss of telephone service is to provide a public switched telephone network (PSTN) service that is connected to the local site wiring. In the event of a failure of the VOIP service, a user would, typically, unplug the terminal adapter and connect a conventional analog telephone to the local site wiring to access the PSTN service. Typically, analog telephones would not be directly connected to the local site wiring prior to the failure because such telephones may then use the PSTN service rather than the VOIP service even when the VOIP service is available.

SUMMARY OF THE INVENTION

Some embodiments of the present invention provide methods, systems and/or computer program products that provide a backup public switched telephone network (PSTN) line for a broadband network connection by detecting unavailability of the broadband network connection and automatically connecting local site wiring to the PSTN line when the unavailability of the broadband network connection is detected. The PSTN line is disconnect from the local site wiring when the broadband network connection is detected as being available.

In further embodiments of the present invention, the unavailability of the broadband network connection is detected by detecting a failure of a network adapter connected to the local site wiring to provide power to the local site wiring. The unavailability of the broadband network connection may also be detected by detecting a power failure at the local site and/or detecting a failure of communications on the broadband network connection.

In certain embodiments of the present invention, detecting unavailability of communications on the broadband network connection includes periodically transmitting a predefined message on the broadband network and determining if a response is received to the periodically transmitted predefined message. Periodically transmitting and determining if a response is received may be carried out irrespective of whether the local site wiring is connected to the PSTN line. The local site wiring may be automatically disconnected from the PSTN line if a response is received to the periodically transmitted predefined message. Such a disconnection may also include determining if a telephone call is in progress using the PSTN line and delaying disconnecting the local site wiring from the PSTN line when a telephone call is in progress using the PSTN line. Power may be provided to the local site wiring if the PSTN line is disconnected from the local site wiring.

In additional embodiments of the present invention, a network adapter provides power to the local site wiring. In such embodiments, providing power to the local site wiring may be disabled if the PSTN line is connected to the local site wiring.

In still further embodiments of the present invention, detecting unavailability includes detecting failure of a network adapter associated with the local site wiring. In some embodiments of the present invention, the broadband connection is a digital subscriber loop (DSL) connection.

In other embodiments of the present invention, a system for providing public switched telephone network (PSTN) line backup to a voice over a packet protocol service includes a local device configured to drive local site wiring when the voice over a packet protocol service is being used and a switch configured to disconnect the PSTN line from the local site wiring if the local site wiring is being driven by the local device and connect the PSTN line to the local site wiring if the local site wiring is not being driven by the local device. The local device may be configured to detect the availability of a broadband connection and to enable driving the local site wiring if the broadband connection is available and disable driving the local site wiring if the broadband connection is not available.

In some embodiments of the present invention, the local device is configured to periodically send and/or receive messages over the broadband connection to determine if the broadband connection is available. A remote communications device may also be configured to send/and or receive messages to/from the local device over the broadband connection. In such a case, the local device may be configured to receive and/or send messages to/from the remote communications device over the broadband connection to determine if the broadband connection is available.

In additional embodiments of the present invention, the local device is further configured to detect a telephone call using the PSTN line and delay enabling driving the local site wiring if a telephone call using the PSTN line is detected. The local device may include a network adapter configured to provide voice over a packet protocol service over the local wiring.

In further embodiments of the present invention, the switch includes a relay. The relay is connected between the local site wiring and the PSTN line and an actuating coil of the relay is coupled to the local site wiring. The relay may be connected between a network interface device (NID) and the local site wiring. The local device may be configured to drive the local wiring with sufficient current to actuate the relay so as to disconnect the PSTN line from the local site wiring. In such a case, the PSTN line provides insufficient current to actuate the relay.

Additional embodiments of the present invention provide a device for providing PSTN line backup to local telephone service. The device includes a relay between local site wiring and the PSTN line. The relay is configured to disconnect the PSTN line from the local site wiring if a current greater than a current supplied by the PSTN line is not supplied to the local site wiring. The relay may be configured to be connected between a network interface device (NID) and the local site wiring.

Further embodiments of the present invention provide a network adapter for providing voice over a packet protocol service. The network adapter includes a modem circuit configured to communicate over a broadband data line and a terminal adapter circuit configured to receive signals from the local site wiring corresponding to communications to be sent over the broadband data line by the modem circuit. A controller circuit is configured to detect availability of a broadband connection using the broadband data line. A local wiring drive circuit configured to selectively provide power to the local site wiring responsive to the availability of a broadband connection using the broadband data line. The controller circuit may also be configured to periodically send and/or receive messages on the broadband connection using the broadband data line so as to determine the availability of the broadband connection.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
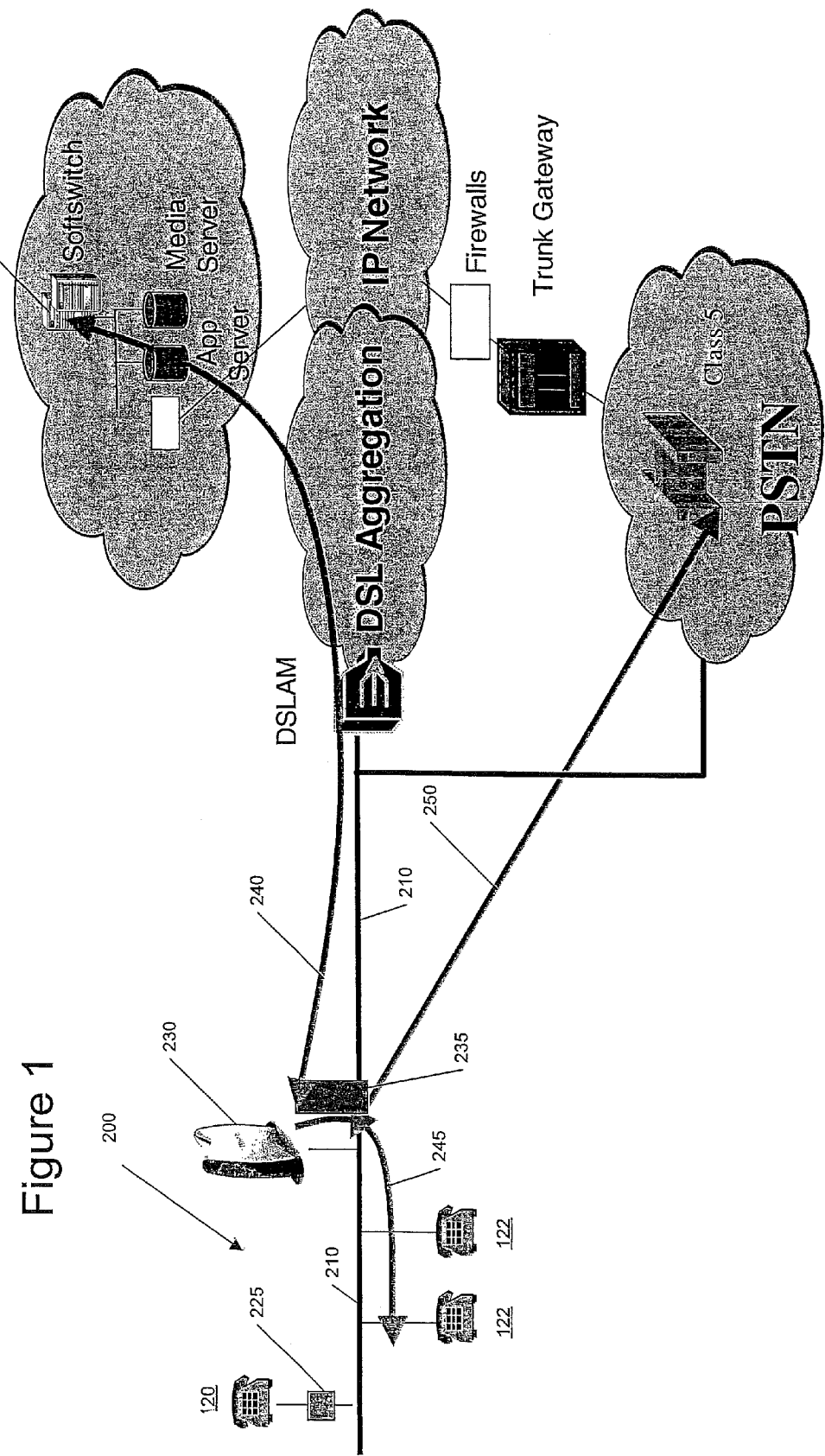
FIG. 1 is a block diagram of a voice over network service including automatic switching to a PSTN service according to various embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Embodiments of the present invention provide for backup of a broadband connection by a PSTN connection where the switchover to the PSTN occurs automatically. In particular embodiments, the PSTN connection may be isolated from local site wiring until failure of the broadband connection occurs. The local site wiring may be powered by a network adapter or other such local device associated with the broadband connection when the PSTN line is not connected to the local site wiring and powered by a central office of the PSTN line when the PSTN line is connected. Accordingly, telephone service may be typically provided by the broadband connection under normal conditions and provided by the PSTN line when a failure of the broadband connection occurs.

It will be understood that the present invention is not limited to a particular high speed network connection technology. Indeed, communication technologies and/or network configurations, such as, but not limited to, Digital Subscriber Line (DSL), Asynchronous Transfer Mode (ATM), frame relay, Hybrid Fiber Coax (HFC), wireless broadband, cable and/or Ethernet may also be used in some embodiments of the present invention. Thus, references to a "broadband network connection" refers to a communication network other than the public switched telephone network that provided high speed data communications. Furthermore, as used herein, DSL is used to refer to the various types of DSL service including, for example, ADSL, SDLS, etc.

FIG. 1 is a block diagram of a voice over network service including automatic backup to a PSTN service according to various embodiments of the present invention. As seen in FIG. 1, a local drop 210 of a telephone/data infrastructure that includes a data line for broadband connection and a PSTN line is connected to local site wiring 200 through a local interface device 235. The telephone/data infrastructure may be conventional telephone/data infrastructure however, in some embodiments of the present invention, "stay alive" messages may be received by and responded to by the softswitch 260 or other such device to indicate that the broadband connection is operational as described in further detail below. The local interface device 235 may include or be provided in addition to a conventional network interface device (NID). The local interface device 235 may include a switching device, such as a relay, that selectively connects the PSTN line to the local site wiring 200 as described in further detail below. In particular, the local interface device 235 may detect that the local site wiring 200 is no longer being driven locally and connect the local site wiring 200 to a PSTN line.

Conventional telephones or Voice over Network telephones, such as Voice over IP telephones, may be connected to the local site wiring 200. Conventional telephones may be directly connected to the local site wiring 200, as illustrated by the telephones 122, or may be connected through an adapter 225, such as telephone 120. If connected through the adapter 225, the telephone 120 may be individually accessed, while the telephones 122 directly connected to a common line of the local site wiring 200 may, typically, only be accessed as a group (e.g. all ring at the same time).

A network adapter 230 may be connected to the data line from the local interface device 235 and is also connected to the local site wiring 200. The network adapter 230 in the embodiments illustrated in FIG. 1 provides broadband access by communicating over the data line with the telephone/data infrastructure and also drives the local site wiring 200 in a manner similar to the manner that a central office drives a PSTN line. However, in some embodiments of the present invention, the network adapter 230 provides a higher current drive (i.e. source or sink) capability than that provided by a central office. For example, a central office typically has a current drive capability of 30 mA for a PSTN line while the network adapter 230 may have a much higher current drive capability. The network adapter 230 may function to provide VOIP service to telephones connected to the local site wiring 200. The network adapter 230 may function in a conventional manner to provide VOIP over the local site wiring 200 other than as described herein with reference to driving the local site wiring and to the use of "stay alive" messages. Accordingly, operations of the network adapter 230 differing from conventional operations will be described in detail herein.

In operation, as illustrated by the arrow 240, the network adapter 230 communicates with the telephone/data infrastructure utilizing the broadband connection and, as indicated by the arrow 245, drives the local site wiring 200 to communicate with the telephones 120 and 122. The network adapter 230 also may periodically send a "stay alive" message to a remote communications device, such as the softswitch 260, and receives "stay alive" messages from a remote communications device, such as the softswitch 260, over the broadband connection. The particular format of the "stay alive" messages may depend on the type of broadband connection. However, a conventional message format for a particular broadband connection, such as a control channel message, may be modified to provide the "stay alive" messages.

The "stay alive" messages from the softswitch 260 may be responsive to receipt of a "stay alive" message from the network adapter 230 or may be periodically sent irrespective of receipt of a "stay alive" message from the network adapter 230. The "stay alive" message from the softswitch 260 may be addressed specifically to the network adapter 230 or may be broadcast or multicast to multiple network adapters. For example, in some embodiments of the present invention where the "stay alive" message is broadcast, the "stay alive" message from the softswitch 260 may include a table of addresses of network adapters from which "stay alive" messages have been received since the last transmission of a "stay alive" message by the softswitch 260. Alternatively, the "stay alive" message may be transmitted by the softswitch 260 in response to receiving a "stay alive" message from the network adapter 230. In such a way, the network adapter 230 may periodically determine that two way communications are operative over the broadband communication. In some embodiments, "stay alive" messages are only transmitted by one of the network adapter 230 or the softswitch 260. However, sufficient information should be available to the network adapter 230 for the network adapter 230 to determine the operational status of the broadband connection. Thus, for example, if the network adapter 230 can detect that a transmission has failed without receiving a responsive "stay alive" message, then the network adapter 230 may be the only device transmitting the "stay alive" messages. Also, if only the softswitch 260 transmits "stay alive" messages, then network adapter 230 could detect failure to receive a "stay alive" message. Accordingly, failure of a transmission and/or receipt of the "stay alive" messages may be used to detect failure of the broadband connection by the network adapter 230.

In some embodiments of the present invention, the "stay alive" messages may only be sent after a period of inactivity on the broadband connection. For example, if no messages have been successfully transmitted and/or received by the network adapter 230 on the broadband connection for 30 seconds, the "stay alive" message may be sent. Thus, the normal message traffic sent and/or received by the network adapter 230 on the broadband connection may be used to determine that the broadband connection is functioning properly and the "stay alive" messages may be utilized if there is insufficient normal message traffic to insure proper operation of the broadband connection. Such a selective use of the "stay alive" message may serve to reduce network traffic resulting from the transmission of "stay alive" messages over a system where "stay alive" messages are sent irrespective of normal message traffic, thereby reducing overhead message traffic associated with detecting the operational state of the broadband connection.

The arrow 250 illustrated that a PSTN line is connected to the local site wiring 200 by the local interface device 235 in the event that the broadband connection through the network adapter 230 fails. Otherwise, the PSTN line may be disconnected from the local site wiring 200 by the local interface device 235. Failures of the broadband connection may include, for example, a power failure to the network adapter 230, a failure of the network adapter 230 or a failure of the broadband connection to the network adapter 230. If a power failure occurs, the network adapter 230 typically no longer drives the local site wiring 200 and the local interface device 235 detects that the local site wiring 200 is no longer being driven locally and connects the PSTN line to the local site wiring 200. If the network adapter 230 fails or detects a failure of the broadband connection, for example, as a result of missed "stay alive" messages, the network adapter 230 may stop driving the local site wiring 200 and the local interface device 235 detect that the local site wiring 200 is no longer being driven locally and connect the PSTN line to the local site wiring 200.

In some embodiments of the present invention, the PSTN line may be selectively coupled to the local site wiring 200 even if the broadband connection is active. The connection of the PSTN line to the local site wiring 200 may be controlled, either remotely or locally, for example, by the network adapter 230 disabling driving the local site wiring 200 so that the local site wiring 200 is connected to the PSTN line. The network adapter 230 may be controlled to disable driving the local site wiring 200 in response to receipt of a message, either over the local site wiring, a local network connected to the network adapter 230 and/or over the broadband connection. The network adapter 230 could also be controlled to disable driving the local site wiring 200 by an input from a button, such as a reset or test button, or the like, of the network adapter 230. The network adapter 230 could also disable driving the local site wiring 200 as part of a diagnostic or test routine, such as a power on self test (POST) of the network adapter 230. For example, the network adapter 230 could disable driving the local site wiring 200 and detect whether the local site wiring 200 was driven by the PSTN to determine if the PSTN backup was functioning properly.

While embodiments of the present invention have been described with reference to the softswitch 260 sending and/or receiving the "stay alive" messages, as will be appreciated by those of skill in the art, other network devices accessible by the network adapter 230 and located in the network in a location that allows testing the operational state of the broadband connection to the network adapter 230 may provide the "stay alive" function described herein with reference to the softswitch 260. Furthermore, while the local interface device 235 has been illustrated as a separate device, the switching function of the local interface device may be provided as part of another device, such as the network adapter 230. Furthermore, the network interface device 235 may be located between the local site wiring and a NID and/or external to the NID. Accordingly, the architecture and/or division of functions illustrated in FIG. 1 is provided as a non-limiting example and embodiments of the present invention should not be construed as limited to the particular architecture and/or division of functions illustrated in FIG. 1 but may be provided by other architectures and/or functional divisions capable of carrying out various of the operations described herein for providing PSTN backup.

Figure 2:
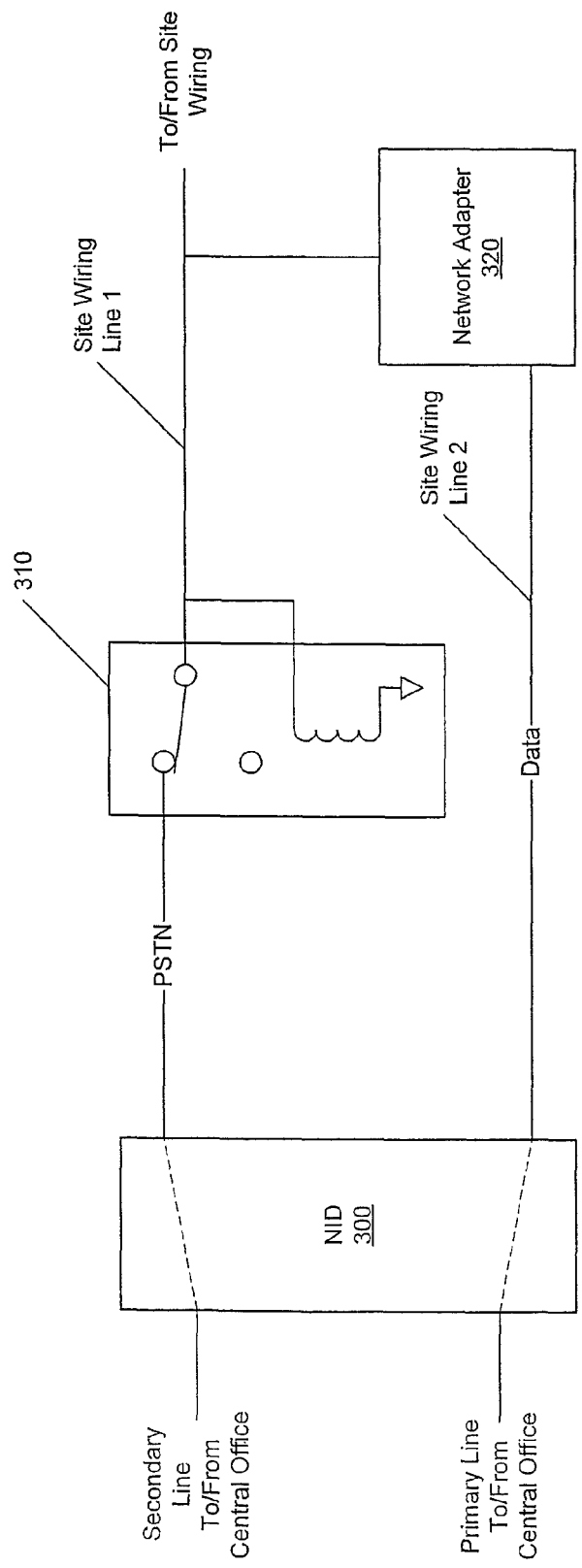
FIG. 2 is a block diagram of a system for provided automatic backup to a PSTN service according to various embodiments of the present invention.

FIG. 2 is a block diagram illustrating connection of a local interface device, a network adapter and local site wiring according to some embodiments of the present invention. As seen in FIG. 2, a NID 300 connects to a conventional line drop from a central office to a local site, such as a residence, that includes a primary line for a data line for a broadband connection and a secondary line for a PSTN line. The PSTN line from the secondary line is connected to a relay 310. The relay 310 selectively connects the PSTN line to a first line (e.g. a first twisted pair) of the local site wiring. The coil of the relay 310 is connected, and in some embodiments, directly connected, to the local site wiring. The data line from the primary line is connected to the network adapter 320 over a second line of the local site wiring. References to primary and secondary lines of the line drop and first line and second line of the local site wiring are provided only to distinguish between the respective lines generically and do not connote a specific wiring twisted pair, drop or other wiring configuration.

When the first line of the local site wiring is driven by the network adapter 320, the relay 310 is energized and the PSTN line is disconnected from the first line of the local site wiring. When the first line of the local site wiring is not driven by the network adapter 320, the relay 310 is not energized and the PSTN line is connected to the first line of the local site wiring such that the PSTN line drives the first line of the local site wiring.

The relay 310 may be configured such that the maximum current sourced by the PSTN line is insufficient to energize the coil of the relay 310 to cause the relay 310 to switch. The current sourced by the network adapter 320 may greater than that provided by the PSTN line and may be sufficient to cause the relay 310 to switch. For example, a central office is typically limited to sourcing 30 mA of current on a PSTN line. If the relay 310 requires more than 30 mA of current to switch, then the network adapter 320 may be configured to source more than 30 mA of current and an amount sufficient to cause the relay 310 to switch. Thus, the relay 310 may detect whether the first line of the local site wiring is being driven by the network adapter 320 or the PSTN line. When the relay 310 is configured to detect whether the first line of the local site wiring is being driven by the network adapter 320, the network adapter 320 may control the operation of the relay 310 by selectively drive the first line of the local site wiring.

In some embodiments of the present invention, the relay 310 may be provided as part of the NID 300. The relay 310 could also be provided as a separate device that, for example, includes modular plugs, such as RJ35-type connectors, to allow easy installation upstream or downstream of the NID 300 relative to the central office. Other configurations may also be provided depending on the wiring of a particular site. For example, the relay 310 could be incorporated in the network adapter 320. Thus, the relay 310 could even be provided in the central office before the PSTN switch. Thus, the relay may be provided anywhere between the local site wiring and a PSTN switch for the line. Furthermore, in some embodiments of the present invention, the relay 310 is connected to the tip line of the local site wiring, in other embodiments of the present invention, the relay 310 is connected to the ring line of the local site wiring. In still other embodiments of the present invention, the relay 310 is connected between the tip and ring lines of the local site wiring.

Figure 3:
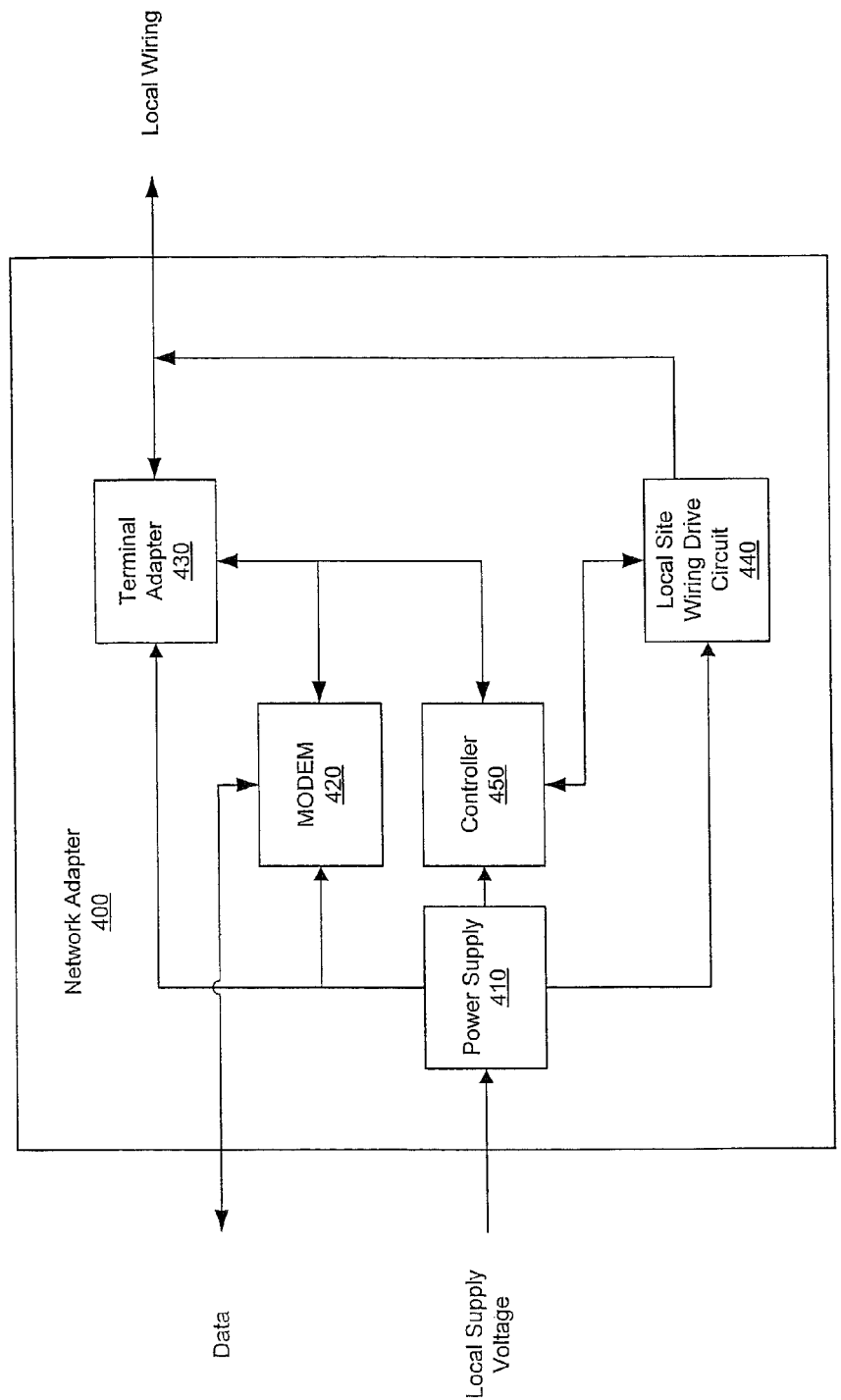
FIG. 3 is a block diagram of a network adapter according to various embodiments of the present invention.

FIG. 3 is a block diagram of a network adapter 400 according to some embodiments of the present invention. As seen in FIG. 3, the network adapter 400 includes a power supply circuit 410 that provides power for operation of the network adapter 400 and for driving the local site wiring. Power supply circuits are known to those of skill in the art and, therefore, will not be described further herein. A modem circuit 420 provides for communications over the data line(s) of the broadband connection. The particular configuration of the modem circuit 420 may depend on the type of broadband connection. Modem circuits are known to those of skill in the art and, therefore, will not be described further herein. A terminal adapter circuit 430 provides an interface to the local site wiring and may convert the signals on the local site wiring to signals for transmission by the modem circuit 420 to provide VOIP services to telephones connected to the local site wiring. Terminal adapter circuits 430 for use in VOIP systems are known to those of skill in the art and, therefore, will not be described further herein.

A local site wiring drive circuit 440 is also provided. The local site wiring drive circuit selectively drives the local site wiring with signals such as those provided by a conventional PSTN line. In particular embodiments of the present invention, the local site wiring drive circuit 440 is capable of driving the local site wiring with sufficient current sourcing capability to cause the local interface device as described above to isolate the PSTN line from the local site wiring. In some embodiments, the local site wiring drive circuit 440 may be omitted.

A controller circuit 450 is also provided. The controller circuit 450 controls the modem circuit 420, terminal adapter circuit 430 and/or local site wiring drive circuit 440 to provided VOIP service with PSTN backup as described herein. In some embodiments of the present invention, the controller circuit 450 includes a processor executing software, such as firmware or other program code. The controller circuit 450 may also be provided by custom hardware and/or combinations of hardware and software. In some embodiments, the controller circuit 450 may be omitted.

The controller circuit 450 may control the various components of the network adapter 400 to selectively drive the local site wiring and/or to detect failure of the broadband connection, for example, as described above with reference to the "stay alive" messages. Furthermore, the controller circuit 450 may carry out self tests of the network adapter 400 to determine whether the network adapter 400 is operating properly. If the network adapter 400 is determined to not be functioning properly such that communications over the broadband connection are unavailable, then the controller circuit 450 may control the local site wiring drive circuit 440 to disable driving the local site wiring.

The network adapter 400 may also be configured such that if power is not provided to the power supply circuit 410, the local site wiring may be driven by another source. Thus, the local site wiring drive circuit 440 may be configured to enter a high impedance state such that the network adapter 400 does not present a load or does not drive to the local site wiring.

Figure 4:
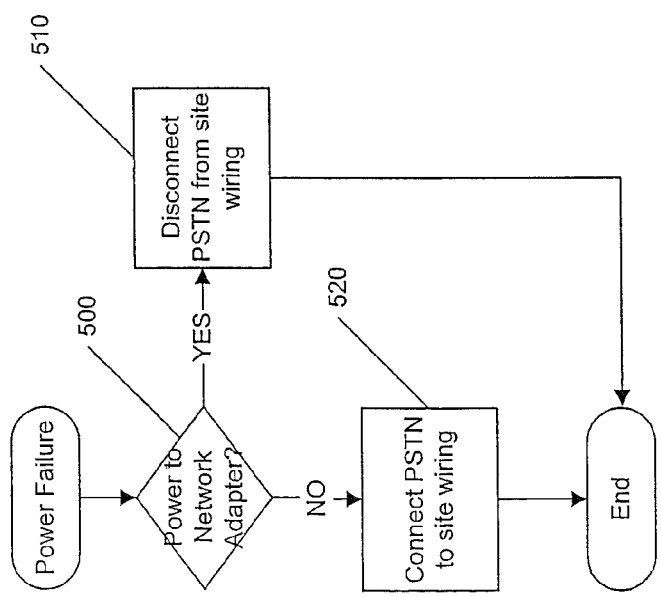

Operations of a network adapter and/or local interface device according to some embodiments of the present invention will now be described with reference to the flowchart illustrations of FIGS. 4 through 7. As seen in FIG. 4, if power is not provided to the network adapter (block 500), such as the network adapters 230, 320, 400, the PSTN line is connected to the local site wiring (block 520), for example, by the relay 310 or the local interface device 235. If power is provided to the network adapter (block 500), such as the network adapters 230, 320, 400, the PSTN line is disconnected from the local site wiring (block 510), for example, by the relay 310 or the local interface device 235. Thus, for example, if a power failure occurs to the network adapter 230, the PSTN line may be connected to the local site wiring. As described above, the power failure may be detected by the network adapter 230 not driving the local site wiring. Furthermore, a power failure may be simulated by the network adapter 230 even if the network adapter 230 still receives power by disabling driving the local site wiring.

Figure 5:
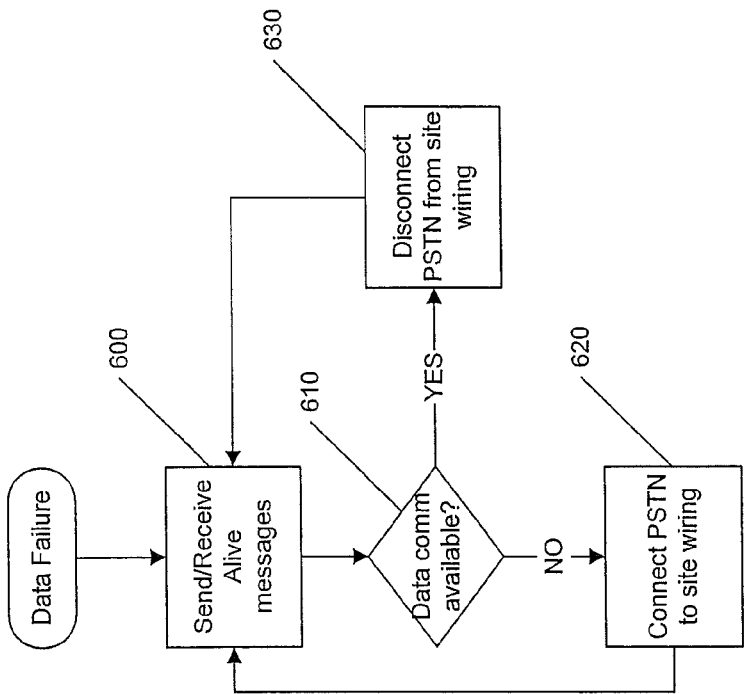
FIGS. 4-7 are flowcharts illustrating operations according to various embodiments of the present invention.

FIG. 5 illustrates operations for a data failure according to some embodiments of the present invention. As seen in FIG. 5, a data failure may be detected by the network adapter periodically sending and/or receiving "stay alive" messages on the broadband connection (block 600). Such messages may, for example, be generated by the controller circuit 450 and transmitted by the modem circuit 420. Similarly, the messages may be received by the modem circuit 420 and processed by the controller circuit 450 to determine if the "stay alive" messages were properly transmitted and/or received. Based on the "stay alive" messages, the network adapter determines if the broadband data connection is available (block 610). Such a determination may, for example, be made by the controller circuit 450. If the broadband data connection is not available (block 610), the PSTN line is connected to the local site wiring (block 620). This may be accomplished, as discussed above, by the controller circuit 450 controlling the local site wiring drive circuit 440 to disable driving the local site wiring so as to cause the relay 310 to connect the PSTN line to the local site wiring. The network adapter may continue to send/receive or attempt to send/receive "stay alive" messages (block 600), so as to determine if the broadband connection subsequently becomes available.

If the broadband data connection is available (block 610), the PSTN line is disconnected to the local site wiring (block 630). This may be accomplished, as discussed above, by the controller circuit 450 controlling the local site wiring drive circuit 440 to enable driving the local site wiring so as to cause the relay 310 to disconnect the PSTN line from the local site wiring. The network adapter may continue to send/receive or attempt to send/receive "stay alive" messages (block 600), so as to determine if the broadband connection subsequently becomes unavailable.

As discussed above, the transmission and/or receipt of "stay alive" message may be periodically and/or selectively carried out. Other techniques for determining the availability of the broadband data connection may also be utilized.

Figure 6:
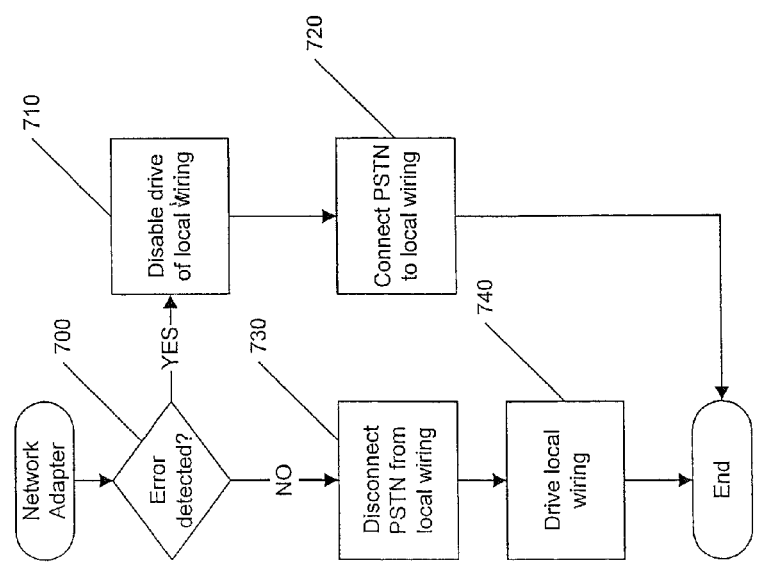

FIG. 6 illustrates operations of a network adapter according to further embodiments of the present invention. As seen in FIG. 6, the network adapter determines if an error is detected (block 700). Such a determination may be made, as described above, through the use of "stay alive" messages, as a result of diagnostic tests of the network adapter or other such technique. In particular embodiments of the present invention, the controller circuit 450 is configured to detect such errors. If an error is detected (block 700), the network adapter disables driving of the local site wiring (block 710) and the PSTN line is connected to the local site wiring (block 720). In some embodiments, this may be accomplished, as discussed above, by the controller circuit 450 controlling the local site wiring drive circuit 440 to disable driving the local site wiring so as to cause the relay 310 to connect the PSTN line to the local site wiring.

If an error is not detected (block 700), the PSTN line is disconnected from the local site wiring (block 730) and the network adapter enables driving of the local site wiring (block 740). In some embodiments, this may be accomplished, as discussed above, by the controller circuit 450 controlling the local site wiring drive circuit 440 to enable driving the local site wiring so as to cause the relay 310 to disconnect the PSTN line from the local site wiring.

Figure 7:
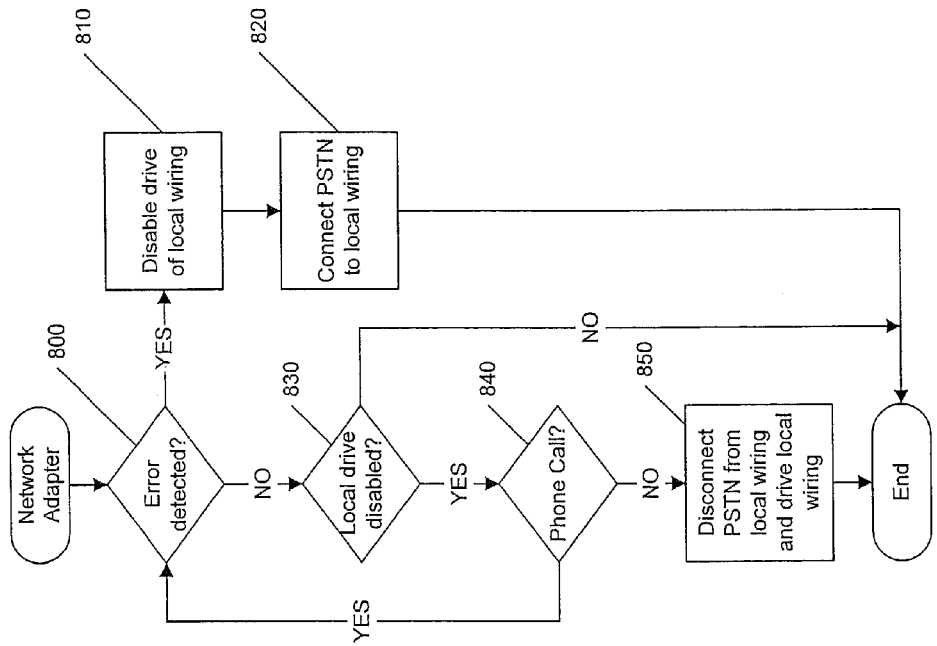

FIG. 7 is a flowchart illustrating operations of a network adapter according to further embodiments of the present invention. As seen in FIG. 7, the network adapter determines if an error is detected (block 800). Such a determination may be made, as described above, through the use of "stay alive" messages, as a result of diagnostic tests of the network adapter or other such technique. In particular embodiments of the present invention, the controller circuit 450 is configured to detect such errors. If an error is detected (block 800), the network adapter disables driving of the local site wiring (block 810) and the PSTN line is connected to the local site wiring (block 820). In some embodiments, this may be accomplished, as discussed above, by the controller circuit 450 controlling the local site wiring drive circuit 440 to disable driving the local site wiring so as to cause the relay 310 to connect the PSTN line to the local site wiring.

If an error is not detected (block 800), the network adapter determines if the local site wiring is currently being driven by the network adapter (block 830). If the local site wiring is already being driven by the network adapter (block 830), then no further actions need be taken as the PSTN line is already disconnected from the local site wiring and the normal operations of the network adapter may continue. If the local site wiring is not being drive by the network adapter (block 830), the network adapter determines if a telephone call is currently in progress using the PSTN line (block 840). Such a determination may be made, for example, by determining the off hook status of the telephones connected to the local site wiring. If a telephone call is in progress (block 840), operations continue at block 800 as the network adapter waits for there to be no error condition and no telephone call in progress. If no telephone call is in progress (block 840), the PSTN line is disconnected from the local site wiring and the network adapter enables driving of the local site wiring (block 850). In some embodiments, this may be accomplished, as discussed above, by the controller circuit 450 controlling the local site wiring drive circuit 440 to enable driving the local site wiring so as to cause the relay 310 to disconnect the PSTN line from the local site wiring.

In particular embodiments of the present invention, the network adapter is configured to power up and/or reset (a hard and/or soft reset) with the local site wiring drive circuit 440 disabled and only begins driving the local site wiring after performing the operations illustrated in FIG. 7. Thus, after a power outage and/or reset, the network adapter would first determine if a telephone call was in process using the PSTN line before driving the local site wiring and, thereby, disconnecting the PSTN line.

While embodiments of the present invention have been described with reference to VOIP service, the present invention may be utilized in other voice over a packet protocol service. Accordingly, embodiments of the present invention should not be construed as limited to a particular packet protocol, such as the Internet Protocol.

The flowcharts and block diagrams of FIGS. 1 through 7 illustrate the architecture, functionality, and operation of possible implementations of systems, methods and computer program products according to various embodiments of the present invention. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of providing a backup public switched telephone network (PSTN) line to a broadband network connection, comprising:
    detecting unavailability of the broadband network connection;
    automatically connecting local site wiring to the PSTN line responsive to detecting unavailability of the broadband network connection and disconnecting local site wiring from the PSTN line when unavailability is not detected,
    wherein detecting unavailability of the broadband network connection comprises detecting a failure of communications on the broadband network connection, and
    wherein detecting unavailability of the broadband network connection further comprises detecting failure of a network adapter associated with the local site wiring, and
    wherein detecting the failure of communications on the broadband network connection comprises:
        transmitting a predefined message on the broadband network after a period of inactivity on the broadband network connection; and
        detecting the failure when no response is received to the transmitted predefined message; and
    automatically disconnecting the local site wiring from the PSTN line when a response is received to the transmitted predefined message, comprising:
        determining if a telephone call is in progress using the PSTN line; and
        disconnecting the local site wiring from the PSTN line if the telephone call is not in progress using the PSTN line.

2. The method of claim 1, wherein detecting unavailability of the broadband network connection comprises detecting failure of a network adapter connected to the local site wiring to provide power to the local site wiring.

3. The method of claim 1, wherein detecting unavailability of the broadband network connection comprises detecting a power failure at the local site.

4. The method of claim 1, wherein transmitting and determining if a response is received are carried out when the local site wiring is connected to the PSTN line.

5. The method of claim 1, further comprising providing voltage to the local site wiring if the PSTN line is disconnected from the local site wiring.

6. The method of claim 1, further comprising:
    providing power from a network adapter to the local site wiring; and disabling providing power from the network adapter to the local site wiring when the PSTN line is connected to the local site wiring.

7. The method of claim 1, wherein the broadband connection comprises a digital subscriber loop (DSL) connection.

8. A computer program product comprising a non-transitory computer readable program media having computer readable program code, the computer readable program code, when executed by a processor, being configured to carry out a method comprising:
  detecting unavailability of the broadband network connection;
  automatically connecting local site wiring to the PSTN line responsive to detecting unavailability of the broadband network connection and disconnecting local site wiring from the PSTN line when unavailability is not detected,
  wherein detecting unavailability of the broadband network connection comprises detecting a failure of communications on the broadband network connection, and
  wherein detecting unavailability of the broadband network connection comprises detecting failure of a network adapter associated with the local site wiring, and wherein detecting the failure of communications on the broadband network connection comprises:
    transmitting a predefined message on the broadband network after a period of inactivity on the broadband network connection; and
    detecting failure when no response is received to the transmitted predefined message; and
  automatically disconnecting the local site wiring from the PSTN line when a response is received to the transmitted predefined message, comprising:
    determining if a telephone call is in progress using the PSTN line; and
    disconnecting the local site wiring from the PSTN line if the telephone call is not in progress using the PSTN line.

\* \* \* \* \*